Patented Sept. 13, 1938

2,129,678

UNITED STATES PATENT OFFICE 2,129,678

AZINE DYESTUFFS

Francis Henry Swinden Curd, Blackley, Manchester, England, assignor to Imperial Chemical Industries Limited, a corporation of Great Britain No Drawing. Application April 1, 1936, Serial No. 72,210. In Great Britain April 25, 1935

3 Claims. (Cl. 260—29)

This invention relates to the manufacture of new azine dyestuffs.

In accordance with this invention, new dyestuffs are prepared by the simultaneous oxidation of a 1,3-diarylamino-naphthalene-8-sulfonic acid (e. g. 1,3-dianilino, 1,3-di-p-toluidino, or 1,3-di-p-anisidinonaphthalene-8-sulfonic acids) with a 4-amino-4'-alkyl diphenylamine-2-sulfonic acid in which the alkyl group contains from 3 to 8 carbon atoms.

4-amino-4'-isopropyl, 4-amino-4'-n-butyl, 4-amino-4'-isoamyl, 4-amino-4'-n-hexyl and 4-amino-4'-n-octyl diphenylamine-2-sulfonic acids are suitable 4-amino-4'-alkyl-diphenylamine-2-sulfonic acids.

The simultaneous oxidation referred to is effected by any of the known methods as given, for example, in British specifications Nos. 11,892 of 1893, 18,729 of 1908 and 414,138. The method preferred is that of specification No. 18,729/08 wherein a current of oxygen, or of a gas containing oxygen, such as air is passed through a weakly alkaline solution of the dyestuff components in presence of a catalyst such as ammoniacal copper oxide.

In British specification No. 18,729/08 there is described the preparation of azine dyestuffs by the simultaneous oxidation of 1,3-diaryl-aminonaphthalene-8-sulfonic acids with para-diamines containing at least one free amino group. Among the para-diamines indicated as suitable for that purpose are 4-amino-2'-methoxy-diphenylamine-2-sulfonic acid and 4-amino-2'-methyldiphenylamine-2-sulfonic acid. I have now found that the dyestuffs obtained by using a 4-aminodiphenylamine-2-sulfonic acid having in the 4'-position an alkyl substituent containing 3 to 8 carbon atoms, are much faster to washing and milling than the dyestuffs of the above mentioned specification.

The new dyestuffs are dark green crystalline powders which dissolve in water to give blue solutions. They dye animal fibres, by the usual methods for acid dyestuffs, in beautiful blue shades which, in addition to the above described advantages, have good fastness to light.

The invention is illustrated but not limited by the following examples in which the parts are by weight.

Example 1

48.8 parts of 1,3-dianilinonaphthalene-8-sulfonic acid and 40 parts of 4-amino-4'-n-butyl-diphenylamine-2-sulfonic acid (made by treating 4-amino-n-butyl-benzene with sodium 1-chloro-4-nitrobenzene-6-sulfonate and reducing the product in the way described by Ullmann and Dahmen, for aniline, in Berichte 41, 3746) are dissolved in 1000 parts of 50% alcohol, with 26.5 parts of calcined sodium carbonate. To this solution is added an aqueous solution of ammoniacal copper oxide prepared from 5 parts of crystalline copper sulfate. The solution is stirred and heated. It is kept at 40 to 45° while air is passed through until the formation of the dyestuff is complete (about 14 hours). The dyestuff which separates in the course of the reaction is filtered off, washed with cold water and dried. It forms a dark crystalline powder with a bronze lustre. It dissolves in hot water to give a blue solution and in concentrated sulfuric acid to give a green solution. It dyes wool in beautiful blue shades of excellent fastness to light and washing. The dyestuff is probably to be represented by the formula:—

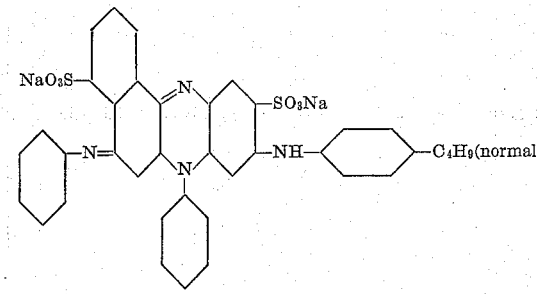

By using 52.2 parts of 1,3-di-p-toluidino naphthalene-8-sulfonic acid in place of the 1,3-dianilino derivative in the above example, a dyestuff possessing similar properties is obtained. Its formula is probably

Example 2

48.8 parts of 1,3-dianilinonaphthalene-8-sulfonic acid and 41.7 parts of 4-amino-4'-isoamyl-diphenylamine-2-sulfo acid (made by treating 4-aminoisoamylbenzene with 1-chloro-4-nitrobenzene-6-sodium sulfonate and reducing the product to the amine, using zinc dust and ammonium chloride) are dissolved in 1,000 parts of 50% alcohol, with 26.5 parts of calcined sodium carbonate. An aqueous solution of ammoniacal copper oxide prepared from 5 parts of crystalline copper sulfate is then added and through the stirred solution air is passed at 40 to 45° for 14 hours or until the formation of the dyestuff is complete. The dyestuff separates during the course of the reaction and is afterwards filtered off, washed well with water and dried. It forms a dark crystalline powder with a bronze lustre. It dissolves in hot water to a blue solution and in concentrated sulfuric acid to a green solution. It dyes wool in beautiful clear blue shades of excellent fastness to light and washing.

The dyestuff is probably represented by the formula:—

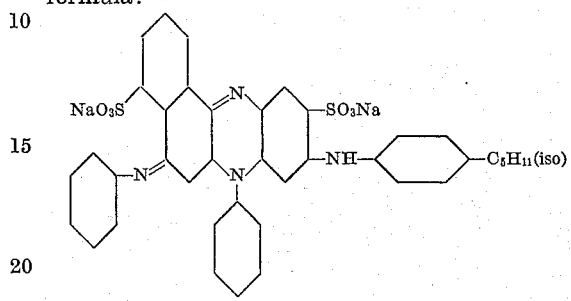

The following table shows other dyestuffs which may be made by replacing a 4-amino-4'-isoamyl-diphenylamine sulfonic acid of the above example by other reagents. They possess similar properties to the dyestuff of Example 2.

The phenyl nucleus carrying the alkyl radical may carry other inert substituents, for instance it may be a tolyl, xylyl, chloro-phenyl or methoxy-phenyl radical. These substituents are therefore included as possibly present when the term "phenylene radical" is applied to the portion of the molecule between the three to eight carbon alkyl and the next NH group.

It will be understood that my invention is susceptible of wide variation and modification without departing from the spirit of this invention.

I claim:

1. A dyestuff having the general formula

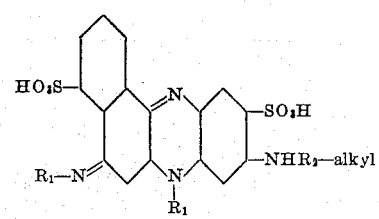

wherein $R_1$ is a monocyclic aryl radical, $R_2$ is a

| Reagent | Probable formula |
|---|---|
| 38.2 parts of 4-amino-4'-isopropyl-diphenylamine-2-sulfonic acid | |
| 43.5 parts of 4-amino-4'-n-hexyl-diphenylamine sulfonic acid | |
| 45.2 parts of 4-amino-4'-n-heptyl-diphenylamine-2-sulfonic acid | |
| 47.0 parts of 4-amino-4'-n-octyl-diphenylamine-2-sulfonic acid | | p-phenylene radical and "alkyl" stands for an alkyl radical containing from 3 to 8 carbon atoms.

2. A dyestuff having the general formula

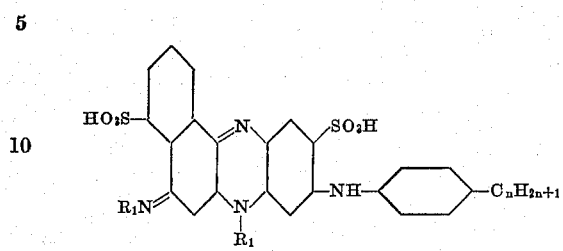

wherein $R_1$ is a monocyclic aryl radical while $n$ represents a numeral from 3 to 8.

3. The dyestuff of the formula

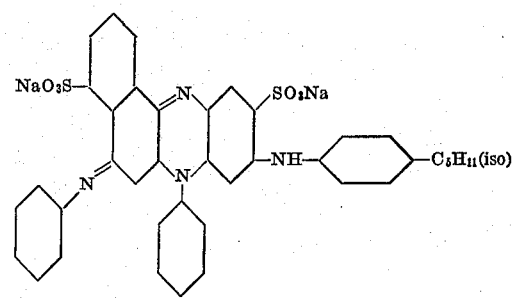

said dyestuff being a dark crystalline powder, soluble in hot water to blue solution, in sulfuric acid to a green solution, and dyeing wool from an acid bath in clear blue shades.

FRANCIS HENRY SWINDEN CURD.